J. MADER.
TRACTOR STEERING GEAR.
APPLICATION FILED OCT. 21, 1920.
1,398,302.
Patented Nov. 29, 1921.
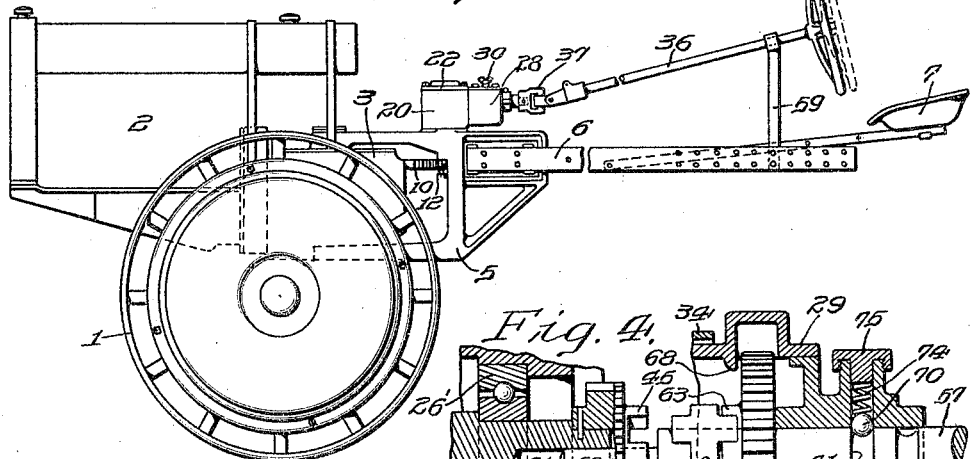
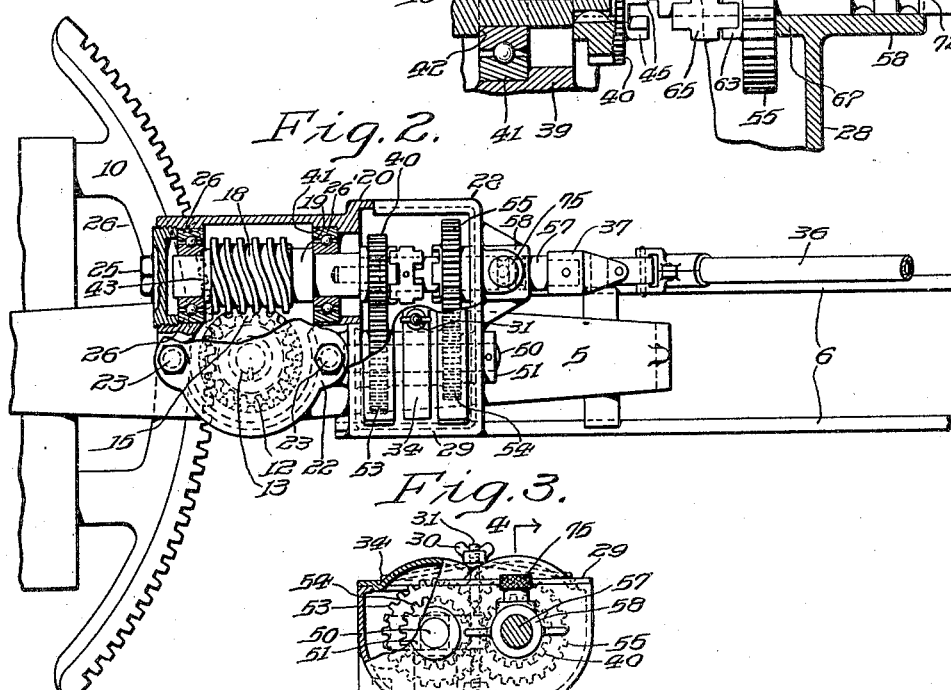
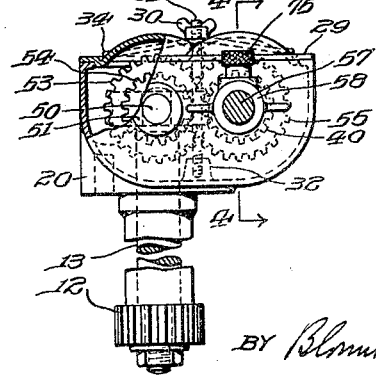
WITNESS
F. J. Hartman.
INVENTOR
Joseph Mader.
BY Blount, Moulton & Welker
ATTORNEYS

UNITED STATES PATENT OFFICE.

JOSEPH MADER, OF PHILADELPHIA, PENNSYLVANIA, ASSIGNOR TO S. L. ALLEN & CO., INC., A CORPORATION OF PENNSYLVANIA.

TRACTOR STEERING-GEAR.

1,398,302.     Specification of Letters Patent.     Patented Nov. 29, 1921.

Application filed October 21, 1920. Serial No. 418,409.

*To all whom it may concern:*

Be it known that I, JOSEPH MADER, a citizen of the United States, and a resident of the city of Philadelphia, county of Philadelphia, and State of Pennsylvania, have invented certain new and useful Improvements in Tractor Steering-Gears, of which the following is a specification, reference being had to the accompanying drawing.

My invention relates particularly to farm tractors of the unstable type, that is, those comprising a pair of traction wheels supporting a power unit, rearwardly from which a horizontally movable beam is arranged to extend which, when the tractor is in operation, is ordinarily coupled to an agricultural implement or the like. The steering of tractors of this character is generally effected by causing relative movement in a horizontal plane between the power unit and wheels on one hand and the beam on the other, usually through the medium of a curved rack supported by the unit and a pinion carried by the beam and rotatable by means of a hand steering wheel supported thereon.

In the operation of machines of this general character it is frequently necessary to exert a relatively great amount of power to effect the steering, while under other conditions less power is required but greater rapidity is desirable so that when the gearing between the manually operated steering wheel and the rack is designed to give a sufficient reduction to enable the requisite power to be applied under conditions when the tractor steers with difficulty, the ability under other conditions to turn the tractor rapidly is sacrificed and vice versa. Moreover when a considerable reduction is effected it is frequently impossible when a very sharp turn is to be made to rotate the steering wheel fast enough to turn the tractor with sufficient speed to keep it on the proper course when advancing at the speeds ordinarily employed and even though it be possible to do so the rapid rotation of the steering wheel is extremely fatiguing to the operator.

A principal object of my invention is the provision of means in a tractor of the general character aforesaid which may be operated to increase or decrease the gear reduction of the steering mechanism to accommodate it to varying operative conditions and which may be conveniently actuated by the operator without removing his hands from the steering wheel.

Further objects of the invention are to provide in the steering gear of a tractor a gear changing mechanism effective to vary the gear reduction of the steering mechanism during the operation of the tractor when and as required and embodying means to retain the various elements in such position that the steering is at all times completely under the control of the operator, and to provide gear changing means of the character aforesaid which are effective in operation, extremely simple in design and construction, and which may be employed in tractors as at present constructed without material alteration or re-designing of the principal parts thereof.

My invention further includes all of the other various objects and novel features of construction and arrangement hereinafter more definitely specified and described.

In carrying out my invention I may employ such instrumentalities and combinations thereof as are effective for accomplishing the results desired, but for the purpose of enabling those skilled in the art to comprehend and practise the invention, I have illustrated in the accompanying drawing, and will now proceed to describe, a preferred embodiment thereof as applied to a farm tractor of well known design and construction, only so much of the latter being shown, and that somewhat diagrammatically, as is requisite for obtaining a clear understanding of the invention.

In the drawing, Figure 1 is a side elevation of such a farm tractor embodying a preferred form of my invention; Fig. 2 is a fragmentary, enlarged top plan view partially in horizontal section of the gearing of the tractor steering mechanism, portions of the gear box cover being broken away for the sake of clearness; Fig. 3 is a fragmentary rear elevation thereof, and Fig. 4 is a still further enlarged fragmentary vertical section of the line 4—4 in Fig. 3. Like numerals are used to designate corresponding parts in the different figures.

The tractor shown in Fig. 1 comprises the traction wheels 1 above which beneath a hood 2 is supported a suitable power unit arranged to drive the wheels through a suitable transmission mechanism contained in the transmission housing or case 3. Pivoted on vertical pivots carried by the transmission housing, extending rearwardly therefrom and movable with respect thereto in a horizontal plane, is a yoke 5 which serves to support in any suitable manner a rearwardly extending beam 6, which as shown comprises parallel side members. This beam may carry the operator's seat 7 and the various levers and other mechanism (not shown) for controlling the power unit and transmission when the tractor is in operation. It will be understood that ordinarily an agricultural implement or the like (not shown) is positioned beneath and secured to the beam and, if desired, to some other portion of the tractor, so that as the tractor traverses the ground the implement is moved in correspondence therewith while preventing more than a limited movement in a vertical plane of the power unit and beam about the axis of rotation of the traction wheels.

Stationarily supported on the transmission case 3 or other convenient portion of the power unit is a segmental rack 10, whose center of curvature is coincident with the vertical pivots on which the yoke 5 is carried, and meshing with this rack is a suitable pinion 12 at the end of a vertically extending pinion shaft 13 which carries at its upper end a worm gear 15 in permanent engagement with a worm 18 rotatable with a horizontally positioned worm or driving shaft 19 supported within a housing 20, which also serves to house the worm gear 15. This housing may be of any convenient shape and is preferably mounted on the upper part of the yoke in such position that the pinion shaft 13 extends downwardly through the upper arm thereof to bring the pinion 12 into engagement with the rack. That portion of the housing in which the worm gear is located is preferably covered by a removable cover plate 22 secured in position by cap screws 23, while that portion containing the worm is preferably made cylindrical and closed at its forward end by a bushing 25, which screws into the housing and engages one of the ball or other antifriction bearings 26, 26' in which the shaft 19 is preferably supported. This construction permits the worm, shaft and bearings in assembling to be inserted in the housing from the forward end thereof, after which the bushing is screwed into place and preferably locked by any suitable locking means, not shown. If desired, however, other forms of housing may be employed so long as the same are effective to provide a suitable support for the worm shaft and prevent the entrance of dust and other foreign matter.

Situated in the rear of the housing 20 and preferably formed integral therewith, is a gear box 28 open at the top and having a removable cover 29 conveniently held in position by a thumb nut 30 threaded onto the end of a long stud 31 positioned in a boss 32 in the bottom of the case and extending vertically for a sufficient distance to pass through the cover and a spring plate 34, the arms of which, when the thumb nut is screwed against its upper surface, are arranged to press on the cover 29 and force the latter into close engagement with the upper edge of the gear box, thereby making a tight joint and preventing the lubricant from working out of the box. If desired, however, any other suitable means for holding the cover in position may be employed, preferably of such character as to permit the easy removal and replacement of the cover to allow inspection of the parts or the introduction of lubricant.

Within the gear box is positioned the change speed gearing which is preferably so designed as to afford a direct drive from the steering wheel 35 through the steering wheel shaft 36 and universal joint 37 to the worm 18 when certain of the parts are in one position and to afford a drive from the steering wheel to the worm through a plurality of spur gears when said parts are in another position to thereby increase the speed of rotation of the worm for a given rotative speed of the steering wheel, and for this purpose I preferably arrange the various elements in the manner now to be described.

The rear end of the worm shaft 19 projects beyond the transverse wall or web 39 between the housing 20 and the gear box 28 and into the latter sufficiently to carry a spur gear 40 which is preferably pinned and keyed or otherwise secured to the shaft as shown in Fig. 4. Means are provided for preventing the shaft from longitudinal movement in the housing, which may conveniently comprise the antifriction bearing 26' which is seated in a recess 41 formed in the housing and abuts against a shoulder 42 formed on the shaft. As the bearing is incapable of movement rearwardly and as the shaft is prevented from similar movement by the contact of shoulder 42 therewith, and additionally prevented from forward movement by engagement with the bearing 26 of a shoulder 43 formed on the shaft in front of the worm, the shaft is restrained from longitudinal movement in either direction and the thrust of the worm taken by the antifriction bearings. Preferably formed integral with the gear 40 and projecting rearwardly therefrom are a plurality of clutch teeth 45 for a purpose to be hereinafter described.

Positioned in the gear box and paralleling the worm shaft is a counter shaft 50, the forward end of which is received in a suitable bushing in the wall of the gear box, and the rear end of which projects through the rear wall of the box and carries a collar 51 preferably pinned to the shaft. Within the gear box and mounted on the counter shaft so as to rotate therewith and rigidly secured thereto as by keys or pins or in any other suitable way, are a pair of spaced spur gears 53 and 54, the former of which is constantly in mesh with the gear 40 and the latter of which is constantly in mesh with a gear 55 carried by and rotatable on the sliding shaft 57 which is mounted concentrically with the worm shaft and extends through a boss 58 formed preferably integral with the rear wall of the gear box. This shaft is connected with one member of the universal joint 37, the other member of which, as hitherto described, is connected with the steering shaft 36 supported in a standard 59 carried by the beam.

The forward end of the sliding shaft 57 is preferably reduced in diameter as at 60 and received in a cylindrical recess 61 in the rear end of the worm shaft 19 which thus forms a bearing for the sliding shaft, the depth of the recess being sufficient to permit the sliding shaft to move forward and backward therein. The gear 55 is provided on its forward face with a plurality of preferably integral clutch teeth 63, and pinned or otherwise secured to the sliding shaft between the gears 40 and 55 is a clutch member 65 which surrounds the shaft and comprises on each face a plurality of teeth projecting in opposite directions and respectively adapted for engagement with the teeth 45 and 63 on the gears 40 and 55, the arrangement being such that when the sliding shaft carrying the clutch member is moved rearwardly, the rear set of teeth on the member will clutch with the teeth 63 to hold the gear 55 in locked relation to the shaft, and when the sliding shaft is moved forwardly, the teeth on the forward side of the clutch member will clutch with the teeth 45, thereby locking the sliding shaft to the worm or driving shaft and providing a direct drive from the steering wheel to the worm. Under this latter condition the gear 40 is effective to rotate the gear 53, the counter shaft and gears 54 and 55 in correspondence with the rotation of the sliding shaft, but as the gear 55 is, except when clutched by the clutch member, freely rotatable on the sliding shaft, the several gears are free to idle when the direct drive is in operation without in any manner interfering therewith. On the other hand, when the sliding shaft is retracted to engage the clutch member with the gear 55, the drive from the steering wheel takes place through that gear, the two gears on the counter shaft and the gear 40 to the worm shaft, and as the ratio of the gearing from the gear 55 to the gear 40 is preferably an increasing one, under these conditions a given speed of rotation of the steering wheel and shaft will produce a more rapid rotation of the worm than when the direct drive is employed.

In order to limit the movement of the sliding shaft rearwardly, means are provided for affording a support to the gear 55 when the clutch member is drawn into engagement therewith, conveniently by extending the boss 58 inwardly a short distance beyond the wall of the gear box as at 67 so that when the clutch is engaged with the gear the latter will abut against the end of the boss as shown in Fig. 4. The gear may also be prevented from movement in the opposite direction in any suitable manner, as by providing a small downwardly projecting lug 68 on the gear box cover effective to engage the forward face of the gear.

Means are also preferably provided for retaining the sliding shaft in its extreme forward and rear positions which may conveniently comprise a ball 70 positioned in a recess in the boss 58 and coöperative with either of a pair of peripheral grooves 71, 72, cut in the surface of the shaft 57 in such manner that when the shaft is retracted the ball will engage in the foremost groove 71, and when the shaft is projected forward the ball will engage the other groove, the ball being suitably spring pressed toward the shaft by a coil spring 74 located within the recess, a threaded plug 75 serving to retain the spring in position therein. The several parts just described are so arranged that the shaft may be readily moved longitudinally, the ball under such conditions riding up on the surface of the shaft between the grooves during the shaft movement and dropping into position in one or the other of the grooves when the latter come into alinement with the ball, thereby holding the shaft locked in forward or rear position as the case may be. As the sliding motion is preferably communicated to the sliding shaft by pulling or pushing on the steering wheel 35 to move it from full line to dotted line position, or vice versa, as shown in Fig. 1, the spring pressed ball or other locking means employed is effective either to hold the parts in position for direct drive or for driving through the gears, thus preventing any tendency for the clutch member to jump out of mesh and thus cause the operator to temporarily lose control of the tractor. However, when desired, a relatively light pull or push on the steering wheel is effective to change from direct to gear drive or vice versa, thus enabling the operator to readily shift from one to the other in accordance with the conditions encountered.

While I have herein illustrated and described a form of my invention in which the direct drive is arranged to give a relatively slow, and therefore powerful, rotation to the worm and the gear drive is arranged to rotate the worm with considerably greater rapidity, it is apparent that these conditions might readily be reversed by suitably proportioning the several gears and the direct drive arranged to give the higher speed to the worm and the gear drive to give the lower speed. Furthermore, I do not desire or intend to limit myself specifically to the particular embodiment of the invention herein shown and described, as suitable changes and modifications may be made in the form, construction and arrangement of the various parts and the invention adapted for use on different forms of tractors without departing from the spirit and scope of the invention as defined in the appended claims.

Having thus described my invention, I claim and desire to protect by Letters Patent of the United States:

1. In tractor steering mechanism, the combination of a worm and worm gear, a longitudinally slidable shaft, a steering wheel connected to said shaft to rotate the same, means for connecting said shaft to drive said worm gear directly, and means for connecting said shaft to drive said worm through interposed gearing, said means being operable by longitudinal movement of said steering wheel.

2. In tractor steering mechanism, the combination of a driving shaft, a sliding shaft, a steering wheel connected with said sliding shaft, a gear carried by said driving shaft, a gear carried by said sliding shaft, gears interposed between said first-mentioned and said last-mentioned gears, and means operative to selectively connect said shafts to effect a direct drive of said driving shaft from said steering wheel or to drive the said shaft through said interposed gears, whereby said driving shaft may be actuated at different speeds with a given rotative speed of said steering wheel.

3. In tractor steering mechanism, the combination of a driving shaft, gearing driven from said shaft, a sliding shaft, a clutch member on said sliding shaft, means connecting said sliding shaft with a steering wheel, and a plurality of gears interposed between said sliding shaft and said driving shaft, longitudinal movement of said sliding shaft being operative to move said member to a position to effect a direct drive of said driving shaft from said sliding shaft or a drive of said driving shaft from said sliding shaft through said gears.

4. In tractor steering mechanism, the combination of a driving shaft, gearing driven from said shaft, a sliding shaft, a clutch member on said sliding shaft, means connecting said sliding shaft with a steering wheel, a plurality of gears interposed between said sliding shaft and said driving shaft, longitudinal movement of said sliding shaft being operative to move said member to a position to effect a direct drive of said driving shaft from said sliding shaft or a drive of said driving shaft from said sliding shaft through said gears, and means for holding said sliding shaft in locked position.

5. In tractor steering mechanism, the combination of a driving shaft, gearing driven from said shaft, a sliding shaft, a clutch member on said sliding shaft, means connecting said sliding shaft with a steering wheel, a plurality of gears interposed between said sliding shaft and said driving shaft, longitudinal movement of said sliding shaft being operative to move said member to a position to effect a direct drive of said driving shaft from said sliding shaft or a drive of said driving shaft from said sliding shaft through said gears, and spring pressed means operative to retain said sliding shaft in the several positions to effect said direct drive and the drive through said gears.

6. In tractor steering mechanism, the combination of a driving shaft carrying a gear, a shaft slidable relatively thereto and also carrying a gear, a steering wheel, means connecting said wheel and said sliding shaft whereby said shaft may be rotated and also moved longitudinally from said steering wheel, means adapted to effect direct connection between said sliding shaft and said gear driving shaft, when said sliding shaft is moved longitudinally to one position and means adapted to effect connection between said shafts through said gears when said sliding shaft is moved longitudinally to another position.

7. In tractor steering mechanism, the combination of a gear driving shaft, a longitudinally slidable shaft, a steering wheel connected to said slidable shaft to rotate the same and operable to move said shaft longitudinally, means adapted to connect said shafts to effect a direct drive of said gear driving shaft from said slidable shaft when said steering wheel is moved to one position, and means adapted to effect a drive of said gear driving shaft from said slidable shaft through interposed gearing when said steering wheel is moved to another position.

In witness whereof, I have hereunto set my hand this 18th day of October, 1920.

JOSEPH MADER.